United States Patent [19]
Van Zee

[11] Patent Number: 5,205,416
[45] Date of Patent: Apr. 27, 1993

[54] FEED HOPPER HAVING OUTLET SLOTS THAT REDUCE MATERIAL SHEARING AND ARE POSITIONED TO STRENGTHEN THE AUGER HOUSING

[75] Inventor: Larry J. Van Zee, Beacon, Iowa

[73] Assignee: Intraco, Inc., Oskaloosa, Iowa

[21] Appl. No.: 797,229

[22] Filed: Nov. 25, 1991

[51] Int. Cl.⁵ .............................................. G07B 1/06
[52] U.S. Cl. .................................. 209/283; 209/397; 222/412
[58] Field of Search ............... 222/412, 413; 209/261, 209/263, 274, 281, 283, 397, 399

[56] References Cited

U.S. PATENT DOCUMENTS

| | | | |
|---|---|---|---|
| 671,780 | 4/1901 | Smith | 209/397 |
| 1,781,472 | 11/1930 | Nagle | 209/283 |
| 2,635,298 | 4/1953 | Lepkowski | 209/397 |
| 3,001,633 | 9/1961 | Heitshu | 222/412 |
| 3,865,727 | 2/1975 | Broling et al. | 209/283 |
| 4,773,599 | 9/1988 | Lynch et al. | 209/283 |
| 5,078,865 | 1/1992 | Huber | 209/261 |
| 5,090,593 | 2/1992 | Ejike | 222/412 |

Primary Examiner—Robert P. Olszewski
Assistant Examiner—Steven M. Reiss
Attorney, Agent, or Firm—Henderson & Sturm

[57] ABSTRACT

An auger apparatus having an elongated housing for permitting granular, powdery or pelletized material to pass therethrough has an inlet is provided for introducing material to be conveyed into one end of the housing and an outlet for causing the material to drop therethrough to a desired destination, this outlet comprising a plurality of elongated openings disposed at least partially in a lower portion of the housing. An auger is disposed in the housing for moving the material therein in one direction through the housing. A motor is provided for rotating the auger about an axis in a direction to cause material disposed in the housing to move from the inlet to the outlet thereof. The lower portion of the housing is at least partially cylindrical in shape and the elongated openings have one end thereof closer to the inlet than to the outlet of the housing and these elongated openings also have one end thereof lower than the other end thereof. A larger opening thereof is disposed downstream from the outlet for receiving large undesirable lumps or chunks of material.

2 Claims, 2 Drawing Sheets

FEED HOPPER HAVING OUTLET SLOTS THAT REDUCE MATERIAL SHEARING AND ARE POSITIONED TO STRENGTHEN THE AUGER HOUSING

TECHNICAL FIELD

The present invention relates generally to augers or moving materials such as pellets or other materials having lumps or the like therein and more particularly to such an apparatus having an outlet structure with narrow diagonally disposed slots therein which permit materials, such as pellets, to be pushed forwardly in such slots by the auger until they drop through the outlet, instead of cutting off the pellet or the like, thereby reducing what would otherwise be a higher resistance to turning of the auger.

BACKGROUND ART

Prior art auger devices have used outlet structures which have small symmetrical holes therein so that as the material being conveyed, such as pellets, is pushed toward the symmetrical holes and is permitted to drop therethrough. One of the problems with the prior art devices is that if a pellet or larger lump of material partially extends into one of these symmetrical holes, it can immediately be pushed against the back edge of the hole by the auger and will thereby be sheared off. This arrangement whereby the auger is pushing against the pellets and shearing them off creates a higher resistance to turning than if the pellet or lump merely falls through the openings or if this shearing force can be eliminated. Consequently, this situation requires a higher horsepower motor to be used on the auger than would otherwise be necessary and contributes to premature failure of motors because of the resistance to turning encountered.

DISCLOSURE OF THE INVENTION

The present invention relates to an auger apparatus having an elongated housing for permitting granular, powdery or pelletized material to pass therethrough. An inlet is provided for introducing material to be conveyed into one end of the housing and an outlet is provided for causing the material to drop therethrough to a desired destination, this outlet comprising a plurality of elongated openings disposed at least partially in a lower portion of the housing. An auger is disposed in the housing for moving the material therein in one direction through the housing, this auger including a helical flighting thereon. A motor is provided for rotating the auger about an axis in a direction to cause material disposed in the housing to move from the inlet to the outlet thereof. The lower portion of the housing is at least partially cylindrical in shape and the elongated openings have one end thereof closer to the inlet than to the outlet of the housing and these elongated openings also have one end thereof lower than the other end thereof. A larger opening thereof is disposed downstream from the outlet for receiving large undesirable lumps or chunks of material.

An object of the present invention is to provide an improved outlet mechanism for augers.

A further object of the present invention is to provide an outlet device which will reduce the resistance to turning of augers.

A still further object of the present invention is to provide a outlet device which reduces the cutting of pellets or other materials being conveyed during the conveying process.

Another object of the present invention is to provide an auger apparatus which can utilize smaller motors and increase the life of such auger turning motors because less resistance to turning of the auger is achieved because of the configuration and arrangement of the outlet mechanism thereto.

Other objects, advantages, and novel features of the present invention will become apparent from the following detailed description of the invention when considered in conjunction with the accompanying drawings.

BEST MODE FOR CARRYING OUT THE INVENTION

Figure 1:
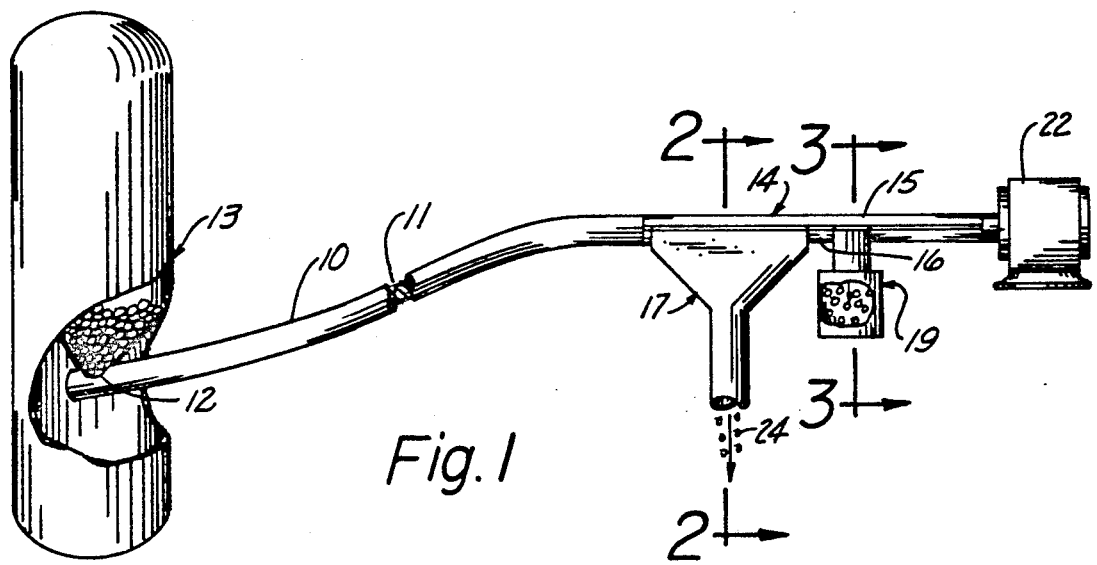
FIG. 1 is a side elevational view of an auger arrangement showing an inlet from a supply of materials to be conveyed to an outlet for the materials and further to a device for collecting undesirable large lumps or chunks of material.
Figure 2:
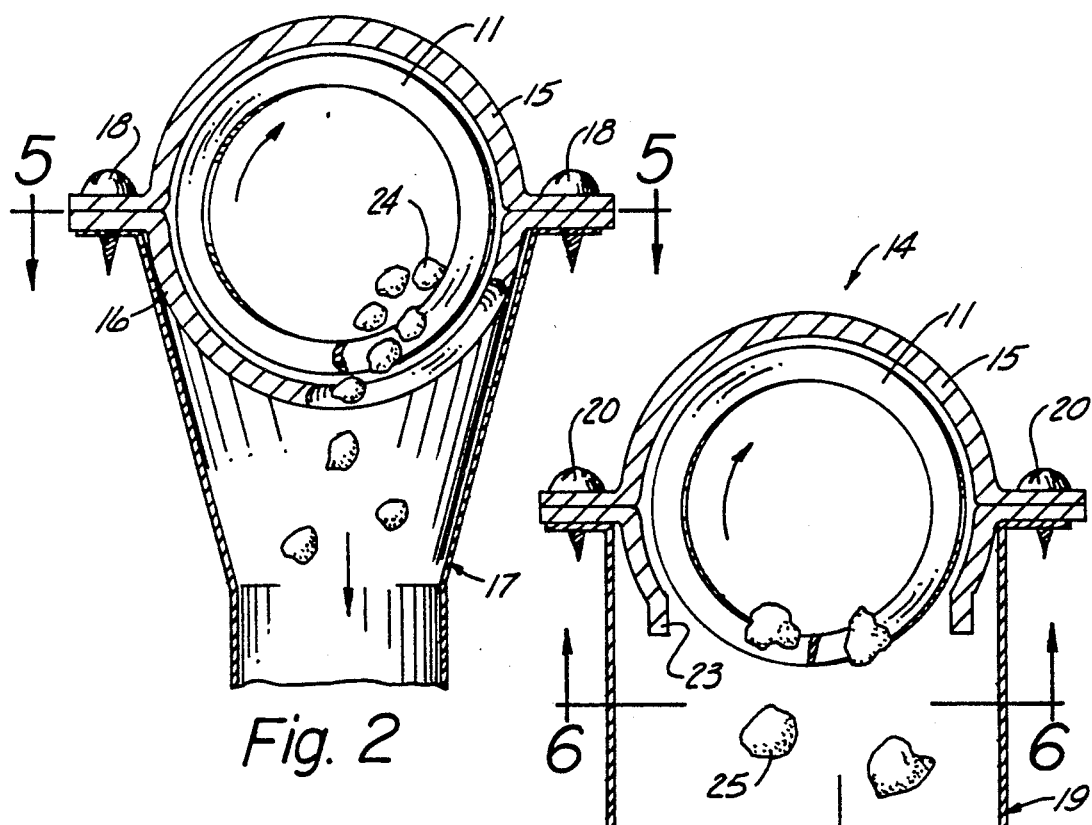
FIG. 2 is an enlarged partial cross sectional view taken along line 2—2 of FIG. i.

Referring now to the drawings wherein like reference numerals designated identical or corresponding parts throughout the several views, FIG. 1 shows an auger tube (10) having an auger (11) disposed therein. The tube (10) has an inlet below opening (12) in supply hopper (13). A housing (14) has a top portion (15) and a bottom portion (16) therein. A funnel shaped outlet device (17) is attached by fasteners (18) as shown in FIG. 2 to the housing (14).

Figure 3:
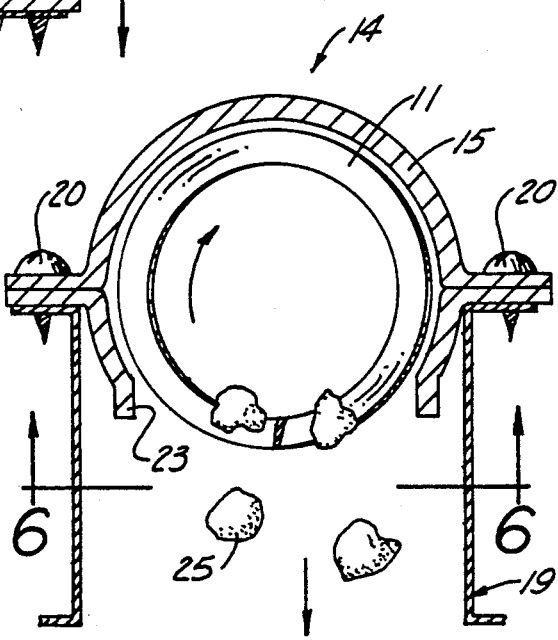
FIG. 3 is an enlarged cross sectional view taken along line 3—3 of FIG. I.

A container (19) is connected by fasteners (20) to another portion of the housing (14) as is shown in FIGS. 1 and 3.

Elongated openings (21) are formed in the lowermost portion (16) of the housing (14) and this housing (14) is essentially cylindrical in shape to receive the helical auger (11) which is disposed therein along the entire length of the auger tube (10) and housing (14). One end of the auger (11) is attached to a motor (22) so that turning of the motor (22) turns the auger (11), it being understood that there can be a transmission device to make the auger turn either slower or faster than the motor (22).

The slots (21) have one end thereof closer to the inlet (12) than to the motor (22) and these elongated openings (21) also have one end thereof which is lower than the other end thereof in lower housing portion (16). A larger opening (23) is formed above container (19) in lower housing portion (16) for reasons which will be explained below.

Figure 4:
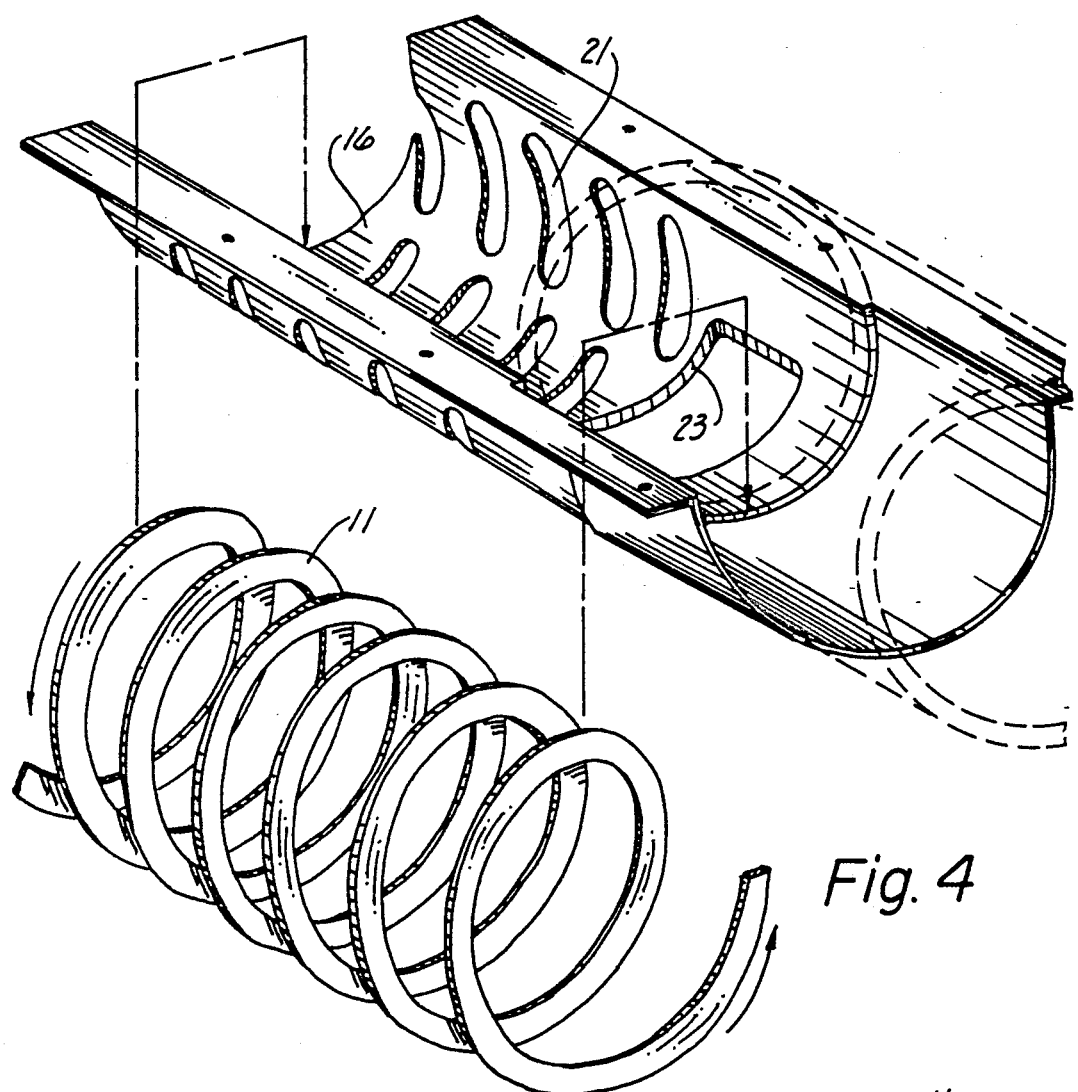
FIG. 4 is a partial perspective, exploded view of the outlet mechanism and the opening for collecting undesirable lumps or chunks as well as the auger which fits inside of the housing which contains these structures.
Figure 5:
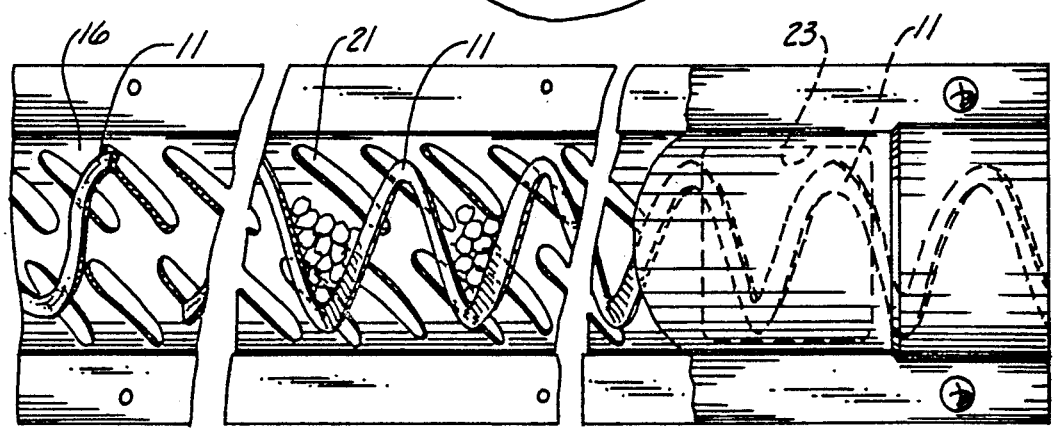
FIG. 5 is an enlarged cross sectional view taken along line 5—5 of FIG. 2 and also showing a portion of the device with the auger not cross sectioned and another portion of the device showing the top of the housing with the auger shown therebelow in dashed lines.

In operation, material, such as pelletized food for animals, is stored in the hopper or storage container (13) and will drop down through openings (12) by gravity into one end of the auger tube (10). When the motor (22) is energized, the auger (11) will rotate in the direction of the arrow shown in FIGS. 2, 3 and 4, which will cause the material to move from left to right as shown in FIGS. I, 4 and 5. The material, indicated by pellets (24) in FIG. 2, will be moved to a position in housing (14) above the funnel shaped outlet (17) so that it can drop out through elongated slots (21) in lower housing portion (16). This will deliver the material (24) to a desired location, for example to a station for feeding animals or the like.

Any of these pellets (24) which enter the leftmost portion of the slots (21) will be pushed to the right and be maintained in the slot (21) as the auger rotates. Most often these pellets will eventually drop through the slots (21) before they reach the end of such elongated slot. This eliminates or greatly reduces the number of pellets (24) that will be pinned against the rightmost edge of the slots (21) and thereby will greatly reduce the amount of shearing of pellets that is likely to occur.

Essentially, all of the material that is conveyed to a position above the funnel shaped housing (17) will drop through elongated slots (21) and out through the funnel shaped housing (17) unless there are lumps or chunks of material that are too large to pass through elongated slots (21). Those larger lumps or chunks (25), as shown in FIG. 3, are designed to drop through a larger opening (23) disposed above container (19) Consequently, these large lumps or chunks (25) will collect in the container (19) and this container (19) will need to be emptied from time to time to discard or recycle the large lumps (25).

Accordingly, it will be appreciated that the preferred embodiment disclosed herein does indeed accomplish the aforementioned objects. Obviously, many modifications and variations of the present invention are possible in light of the above teachings. It is therefore to be understood that, within the scope of the appended claims, the invention may be practiced otherwise than as specifically described.

I claim:

1. An auger apparatus for delivering granular or pelletized frangible materials of a certain size to a desired location; wherein, the auger apparatus comprises an elongated generally cylindrical housing means for permitting the granular or pelletized materials to pass therethrough said housing means including a top portion and a bottom portion; wherein, at least the bottom portion of the housing has a semi-circular half-moon cross-sectional configuration;

inlet means for introducing material to be conveyed into one end of said housing means;

outlet means for causing said material of a certain size to drop therethrough to the desired location, said outlet means comprising a pair of opposed offset rows of spaced elongated openings disposed in the lower portion of the housing; wherein, each row of said pair of rows of elongated openings are disposed on the opposite sides of the lowermost point of the bottom portion of the housing for providing increased strength thereto; and wherein, an imaginary line drawn longitudinally through the middle of one of said rows of elongated openings from one end to the other thereof will be neither perpendicular to or parallel to said axis;

auger means disposed therein in one direction through said housing means, said auger means including a helical flighting thereon; and, means for rotating said auger means about an axis in a direction to cause material disposed in said housing means to move from said inlet means to said outlet means; to minimize the amount of frangible material that can become trapped and pulverized between the auger means and the lower portion of the housing.

2. The apparatus of claim 1 including opening means disposed in a lower portion of said housing downstream from said outlet means for receiving oversized material therethrough which is too large to pass through said rows of elongated openings.

* * * * *